July 25, 1939.  G. SOLOMON  2,167,533
TORQUE COMPENSATOR FOR AIRPLANES
Filed Aug. 25, 1938  2 Sheets-Sheet 1
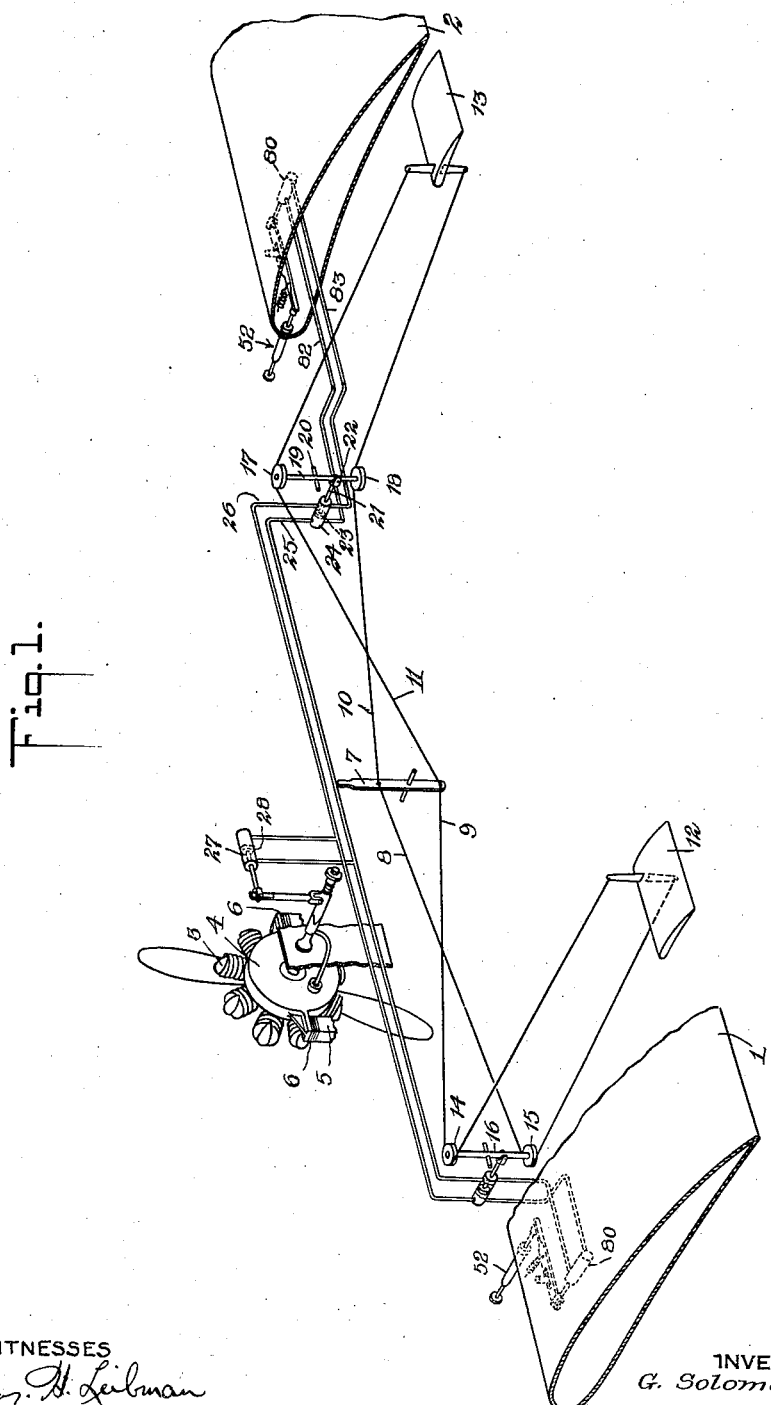

July 25, 1939.   G. SOLOMON   2,167,533
TORQUE COMPENSATOR FOR AIRPLANES
Filed Aug. 25, 1938   2 Sheets-Sheet 2
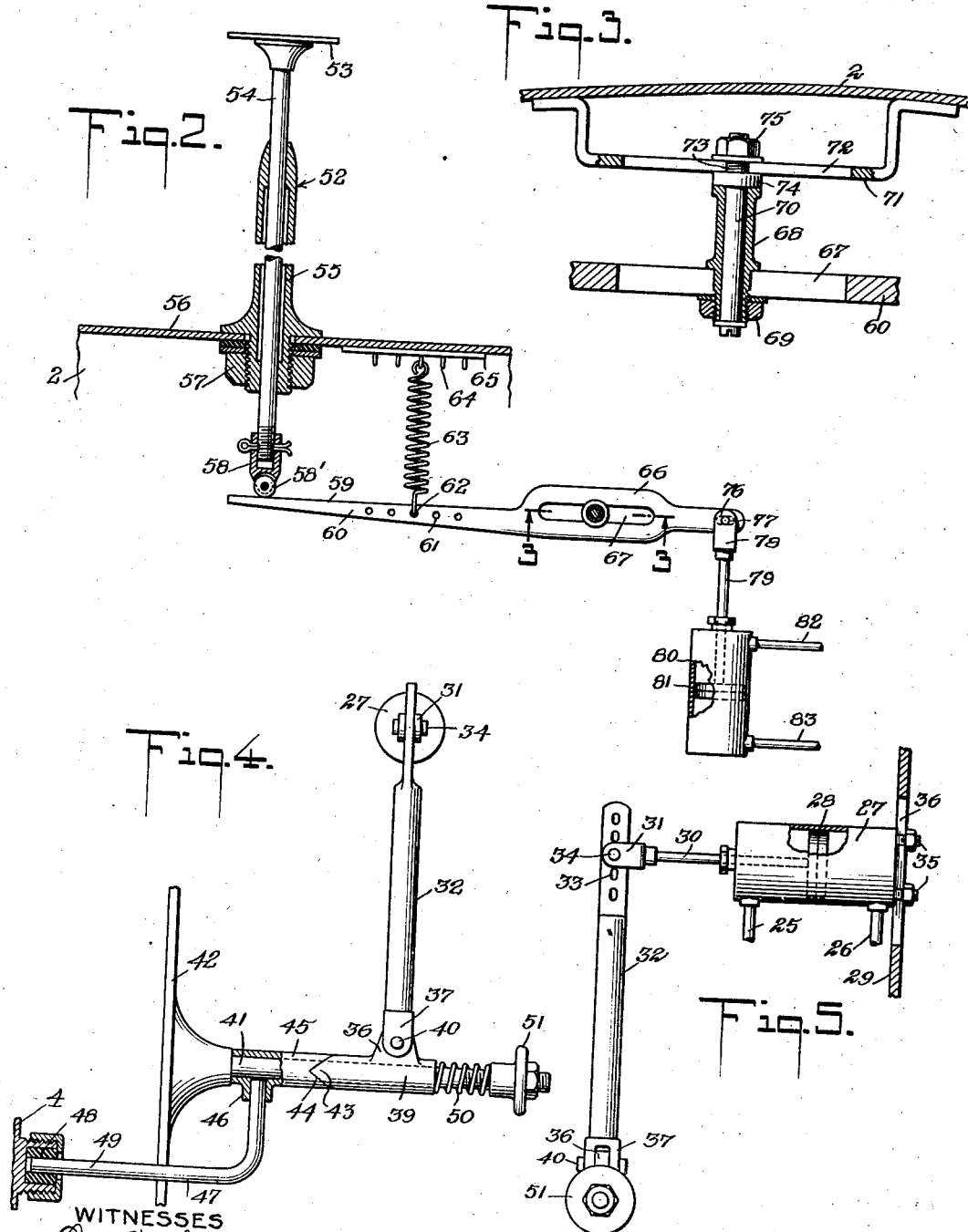
WITNESSES
INVENTOR
G. Solomon
BY
Munn, Anderson & Liddy
ATTORNEYS Patented July 25, 1939

2,167,533

UNITED STATES PATENT OFFICE 2,167,533

TORQUE COMPENSATOR FOR AIRPLANES

Guillermo Solomon, Santiago, Dominican Republic

Application August 25, 1938, Serial No. 226,750

10 Claims. (Cl. 244—76)

This invention relates to torque compensating devices for airplanes, and has for an object to provide a construction which may be used in connection with a single-motor airplane or a plural-motor airplane and caused to function sufficiently to compensate for the torque of the engine.

Another object of the invention is to provide a compensating device for airplanes which will compensate for the torque of the engine and the action or non-action of the air against the wings and/or ailerons of the airplane.

A further object, more specifically, is to provide a compensating device for taking care of or compensating for the torque created by the engine of an airplane, with the device connected to the ailerons of the airplane or to special blades and arranged to function automatically without interfering with the use of the usual joy stick or other control member.

In the accompanying drawings—

Fig. 1 is a diagram in perspective illustrating portions of an airplane and an embodiment of the device applied thereto;

Fig. 2 is a view partly in section and partly in elevation illustrating the detail structure of a feeler embodying certain features of the invention;

Fig. 3 is a detail fragmentary sectional view through Fig. 2 approximately on the line 3—3, the same being on an enlarged scale;

Fig. 4 is a side view on an enlarged scale with certain parts broken away, illustrating a master cylinder and parts connecting the same with the motor base of the engine of the airplane;

Fig. 5 is a view at right angles to that shown in Fig. 4 and illustrating the master cylinder, lever, and associated parts coacting specifically with the cylinder.

Referring to the accompanying drawings by numerals, 1 and 2 indicate the wings of an airplane, and 3 the motor which has a sutable base 4. It will be understood that the base 4 and motor 3 may be of any desired construction. Preferably the base 4 is mounted on suitable supports 5 having rubber or other cushioning members 6, whereby as the motor starts and begins to gain speed the base 4 will rotate slightly, as for instance from nothing up to about one inch.

In most airplanes the wings are differently pitched so as automatically to take care of the torque of the engine, or of the plurality of engines if used if these do not revolve in opposite directions when the airplane is moving at cruising speed. A construction of this kind automatically maintains the airplane on even keel when at the speed indicated but will not maintain the airplane on an even keel when the airplane is going slower or faster than cruising speed. Heretofore an aviator would shift the ailerons to take care of the proper balance of the airplane except when moving at the desired cruising speed. Where an airplane is climbing the engine is operated at full speed but the airplane is moving slower than cruising speed, and heretofore the aviator would adjust the ailerons to keep the airplane on even keel. Where the airplane is diving it quite often moves at a quicker speed than cruising speed and again the aviator must adjust the ailerons to take care of this condition. Where the airplane is gliding and makes a forced landing the speed may be less than cruising speed and again the aviator must operate the ailerons to secure the desired balance or even keel of the airplane.

When using the present invention the wings are set at the same angle on both sides and the necessity of the aviator adjusting the ailerons for different speeds is not necessary as the device will automatically take care of these conditions. When the airplane is moving faster than cruising speed, as for instance when it is diving, the present invention will likewise automatically take care of this condition. Also when a forced landing is necessary and the airplane is moving slower than cruising speed, the device embodying the invention takes care of this condition, as well as taking care of the condition when the airplane is moving at a speed slower than cruising speed.

In Fig. 1 an illustration is presented of the invention applied to a single-motor airplane in order to show the construction of the parts and how they function automatically without interfering with the aviator's use of the joy stick. Referring to this figure, it will be seen that there is provided the customary joy stick 7 mounted in the usual way and connected to the respective cables 8, 9, 10 and 11 extending to the respective ailerons 12 and 13.

The construction described from numerals 7 to 13, inclusive, is the usual construction found in airplanes today. However, instead of running cables in the usual direction over pulleys and other guides, the cables 8 and 9 pass over pulleys or guides 14 and 15 mounted on a single shaft 16, while cables 10 and 11 pass over pulleys or other suitable guides 17 and 18 carried by a single shaft 19. As shafts 16 and 19 and associated parts are identical a description of shaft 19 and associated parts will apply to shaft 16 and associated parts.

As shown in Fig. 1, there is provided an axle or pivotal support 20 for shaft 19, said axle being arranged centrally on the shaft and extending in a horizontal plane, or rather in a plane parallel with the front edge of aileron 13. This will allow the shaft 19 to swing in a vertical plane at right angles to the swinging movement of aileron 13. When the joy stick 7 is used the cables 10 and 11 are pulled or released in the usual way for swinging the aileron 13, when it is desired to bank or otherwise produce a certain action in the aileron. However, to secure a desired compensation there is provided a rod 21 pivotally connected at 22 to shaft 19. This rod carries a piston 23 in an auxiliary cylinder 24. Pipes or tubes 25 and 26 are connected to the respective ends of cylinder 24 and also to the respective ends of the master cylinder 27. The master cylinder 27 is provided with a piston 28 which is normally arranged centrally of the cylinder as shown in Fig. 5. It will be understood that the master cylinder, the auxiliary cylinder, and the various tubes or pipes associated therewith are all filled with liquid so that motion may be transmitted in a hydraulic manner. By reason of the construction just described if the piston 28 is moved in one direction there will be a movement of the liquid in the pipes 25 and 26 and also in the cylinder 24 for pulling or pushing rod 21. If the rod 21 is pushed the shaft 19 will swing on its axle 20 in a direction for raising the trailing edge of the aileron 13. However, if the rod is pulled there will be a reverse motion whereby the trailing edge of the aileron 13 will be depressed. This action takes place without in any way interfering with the joy stick 7 and the control by the aviator.

The master cylinder 28 is bolted or otherwise rigidly secured to a stationary support 29, as shown in Fig. 5, said support being part of the airplane. A piston rod 30 is connected with the piston 28 and is pivotally mounted at 31 to a swinging arm 32. Suitable apertures 33 accommodate the pivotal pin or bolt 34 whereby the parts may be adjusted. Preferably securing bolts 35 connected with the cylinder 27 are accommodated in a slot 36 so that the cylinder may be raised or lowered as desired to permit a greater or less movement of the piston 28 for a given movement of the arm 32. Arm 32 is provided with a bifurcation 37 at the lower end so as to straddle a lug 38 carried by a sleeve 39. A bolt or pivotal pin 40 connects the bifurcated end with the lug whereby the arm 32 may swing in a certain plane freely to adjust itself to a position in respect to the cylinder 27. Sleeve 39 is adapted to be rotated in one direction or the other and thereby swing arm 32 to move piston 28 back and forth and thereby displace the liquid in the circulating system. Sleeve 39 is rotatably mounted on a pin or shaft 41 which is secured to a stationary part 42 of the airplane. Sleeve 39 is provided with a V-shaped end 43 fitting into a V-shaped socket 44 carried by an auxiliary sleeve 45. Sleeve 45 is provided with a hollow boss 46 in which one end of an arm 47 snugly fits. The other end of arm 47 extends into a rubber or other cushioning member 48 carried by a suitable extension from the base 4 of the engine 3.

When the engine is first started the base 4 will rotate slightly until the engine has reached its maximum. This will swing the end 49 of arm 47 in an arc around the shaft 41 and by reason of the arrangement, as shown in Fig. 4, sleeve 45 is blocked. This movement is yieldingly communicated by the shape of the socket 44 and end 43 to sleeve 39, whereby the arm or lever 32 will be swung accordingly. A spring 50 surrounds the outer end of the pin or shaft 41 and continuously presses against the sleeve 39 so that if there were a sudden turning forward or backward movement of the sleeve 45 the sleeve 39 would move away from the position shown in Fig. 4 to the right against the action of spring 50, but this spring would gradually move the sleeve back to the position with the extension 43 fitting snugly in socket 44. This will give a desired swing to the arm 32 but this swing is not a sudden jerk. A suitable nut 51 is provided on the end of shaft 41 so as to vary the tension of spring 50. By reason of this construction whenever the engine is operating at a higher or lower speed than cruising speed, an extra movement will be given to the piston 28 so as to shift the ailerons to take care of or compensate for the change in pressure against the wings by reason of this change in speed of the airplane.

In addition to the compensating features just described, there is provided what may be termed a "feeler" to take care of other conditions, as for instance, when the airplane is diving, climbing, or running at speeds under or over cruising speed. The speed of the airplane under these circumstances is much faster than the proportional speed of the engine and as both wings are set at the same angle there is no tendency to corkscrew. Also when the airplane is volplaning to a landing place the speed is comparatively slow as the engine is not turning over or at the best is turning over very slowly so that there will be very little movement of the piston 28 by reason of the torque of the engine. To take care of these various conditions, as well as other conditions, the feeler 52 has been provided. It will be understood that there is a feeler 52 on each wing if the airplane is a monoplane and that they cooperate to secure the same results. The particular construction of this feeler is illustrated in Figs. 2 and 3. From these figures it will be observed that there is provided a flat plate or disk 53 which faces in the direction of flight of the airplane and, consequently, the air presses against the same and gives the plate 53 a tendency to force the rod or shaft 54 towards the controlling edge of the wing. Rod 54 is slidingly mounted in a suitable guide 55 carried by the leading edge 56 of the wing 2. This guide is rigidly clamped in place by a suitable mounting 57. It therefore permits the rod 54 to slide back and forth as other parts act thereon. A fitting 58 is carried by the rear end of the rod 54 and this fitting in turn carries a roller 58' which bears on the flat surface 59 of a lever 60. Lever 60 is provided with a number of apertures 61 for accommodating at different times the end 62 of a contractile spring 63. The opposite end of the contractile spring 63 is carried by any one of the hooks or loops 64 secured to a plate 65, which in turn is secured to the wing 2. It will be understood that other means for connecting the ends of spring 63 may be provided without departing from the spirit of the invention, but these particular structures have been shown to illustrate the adjustability of the spring so that various tensions may be secured on the same spring.

Lever 60 is provided with an enlargement 66 having a slot 67 which accommodates a sleeve 68 rigidly clamped in place by a suitable nut 69. A journal pin 70 is rotatably mounted in sleeve 68 and is carried by a bracket 71 secured to the wing 2. The bracket 71 is provided with a slot 72 for accommodating the threaded reduced ends 13 of pin 70, which pin is provided with an abutment 74 so that when the nut 75 is tightened the rod will be firmly clamped to the bracket 71. By reason of this structure the pin 70 may be adjusted to suit varying conditions. Also the sleeve 68 may be adjusted in slot 67 to suit varying conditions. The end of lever 60 opposite that engaged by roller 58 is provided with a slot 76 which accommodates a pin 77 carried by the bifurcated end 78 of a piston rod 79 and this rod extends into a feeler cylinder 80 and is secured to a piston 81. Flexible pipes or tubes 82 and 83 extend to cylinder 24 and are connected thereto at the respective ends so as to coact with the pipes or tubes 25 and 26. It will be understood, of course, that the feelers on both wings function at the same time and are complementary to each other so that both of the ailerons 12 and 13 will be functioning at the same time automatically to compensate engine torque when any exists.

While these parts all function automatically at different speeds and under different conditions, the structure does not in any way interfere with the use of the joy stick 7 so that if desired the aviator may bank the airplane at any time or may tilt or depress either wing as he may prefer.

I claim:

1. A torque compensator for airplanes including means controlled by the movement of the base of the motor of an airplane for automatically shifting the ailerons to compensate the torque of the engine.

2. A torque compensator for airplanes comprising means operated by the torque of the engine of an airplane for automatically shifting the position of the ailerons of the airplane, and wind-actuating means coacting with the first-mentioned means for causing the shifting of the position of the ailerons when the means actuated by the engine are not fully functioning.

3. A torque compensator for airplanes designed to maintain the airplane on an even keel comprising means for automatically shifting the ailerons, said means including an air pressure actuating mechanism and a hydraulic mechanism actuated by the turning movement of the base of the engine used in driving the airplane.

4. In a torque compensator for an airplane, a feeler structure including a plate adapted to face in the direction of flight of the airplane, a reciprocating rod secured to said plate and adapted to be moved in one direction by said plate, a spring for moving said rod in the opposite direction, a cylinder, and a piston adapted to be actuated by said spring and rod in proportion to the movement of the rod.

5. In a torque compensator for airplanes, a feeler structure including a wind-engaging member adapted to be moved toward the trailing edge of the wings of the airplane when the airplane is in flight, a reciprocating rod adapted to be moved toward the trailing edge of said wings when the wind-engaging member is moved toward the trailing edge of said wings, a cylinder, a piston in said cylinder, a rod secured to said piston extending from one end of said cylinder, a lever pivotally connected at one end to one end of said rod, said lever being pivotally mounted intermediate its ends, the rear end of said rod resting against the end of said lever opposite the end connected to said rod, and a spring for swinging said lever in the opposite direction to which it is moved by said rod.

6. In a torque compensator for an airplane, a feeler structure including a rod guide carried by the wing of the airplane, a reciprocating rod carried by said guide, said rod having an enlarged end facing in the direction of flight of the airplane, a lever pivotally mounted intermediate its length, said lever being positioned so that one end will continually rest against the rear end of said rod so that as said rod is moved toward the rear by the pressure of air against said enlarged end said lever will be swung in one direction, a spring acting on said lever for swinging the same in a direction opposite to the swinging movement caused by said rod, a cylinder, a piston positioned to slide back and forth in said cylinder, a piston rod secured to said piston extending from one end of said cylinder, and means for pivotally connecting the end of said rod with the end of said lever farthest from said rod.

7. A torque compensator for an airplane having an engine formed with a base provided with means capable of permitting the base to rotate partly when the engine is functioning with the degree of rotation agreeing with the torque of the engine, comprising means actuated by the rotation of said base for shifting the ailerons in proportion to the movement of said base, said means including a substantially vertically arranged shaft for each aileron, aileron cable guides carried by each end of said shaft, means for pivotally mounting said shaft so that it may rotate in a vertical plane at right angles to the plane of rotation of the ailerons, a reciprocating rod connected with said shaft for rocking the same and thereby tilting said ailerons, a piston secured to said rod at one end, a cylinder surrounding said piston, tubular members connected to the respective ends of said cylinder, a master cylinder positioned near the engine of the airplane, a piston arranged in said master cylinder, means connecting the piston in said master cylinder with the base of said engine so that the piston will be moved in proportion to the rotary movement of said base, said tubular member being connected to the respective ends of said master cylinder, and liquid filling the first-mentioned cylinder, the master cylinder and said tubular member whereby the movement of the piston in the master cylinder will be transmitted to the piston in the first-mentioned cylinder.

8. In a torque compensator for an airplane, a hydraulic structure for automatically shifting the ailerons of the airplane to keep the airplane on an even balance and a plurality of means for causing said hydraulic structure to function, one of said means being actuated by the base of the engine of the airplane and the other by the pressure of the wind.

9. In a torque compensator for an airplane having an engine provided with a base and means for permitting said base to turn slightly but in proportion to the torque of the engine, a hydraulic structure for automatically shifting the ailerons of the airplane to counteract torque, and a plurality of means for causing said hydraulic structure to function, one of said means including a cylinder forming part of said hydraulic structure, a piston in said cylinder and means connecting said piston with the base of said engine for transmitting motion to said piston in proportion to the torque of the engine, and the other of said means including a spring-held rod adapted to be moved in one direction by the pressure of the wind which the airplane faces, a cylinder forming part of said hydraulic structure, a piston in said cylinder and means connecting said rod with said piston for causing the piston to move back and forth with said rod.

10. In a torque compensator for an airplane, an engine provided with a base and means for connecting the base with the airplane in such a manner as to permit the base to turn slightly in proportion to the torque of the engine, a hydraulic structure for automatically shifting the ailerons of the airplane to counteract torque, and a plurality of means for causing said hydraulic structure to function, one of said means including a cylinder forming part of the hydraulic system, a piston in said cylinder, and means connecting said piston with the base of the engine for transmitting motion to said piston in proportion to the torque of the engine, said last-mentioned means including a swinging arm, a supporting shaft, a tubular member rotatably mounted on said supporting shaft and pivotally connected with said arm, said tubular member being V-shaped at one end, a stationary socket surrounding said support and positioned to receive said V-shaped end, and an adjustable spring for urging said tubular member so that the V-shaped end will remain in said V-shaped socket.

GUILLERMO SOLOMON.